Jan. 20, 1948. W. C. EAVES 2,434,842
PNEUMATIC SOUND PRODUCING DEVICE
Filed Jan. 1, 1942 2 Sheets-Sheet 1
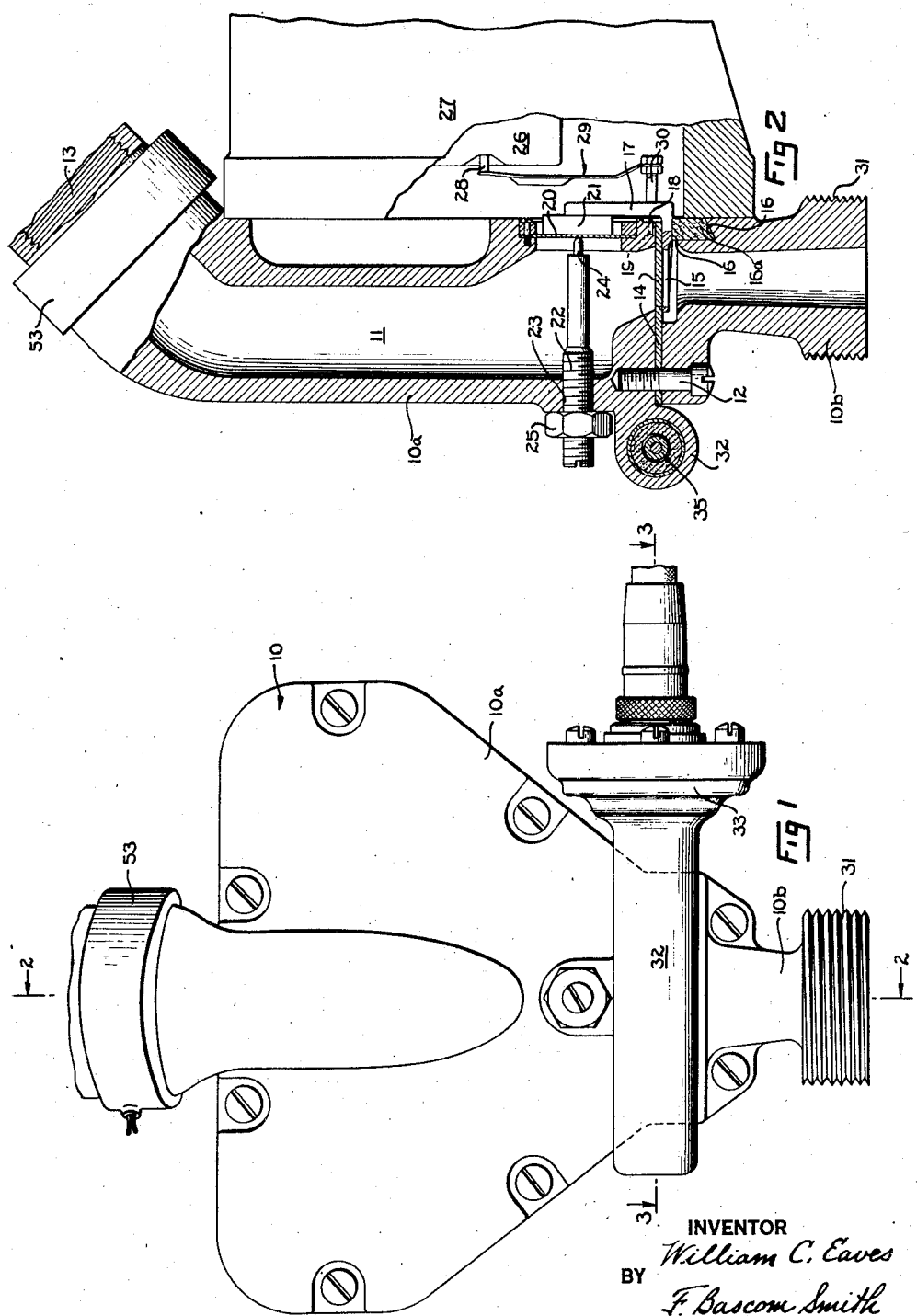
INVENTOR
William C. Eaves
BY
F. Bascom Smith
ATTORNEY

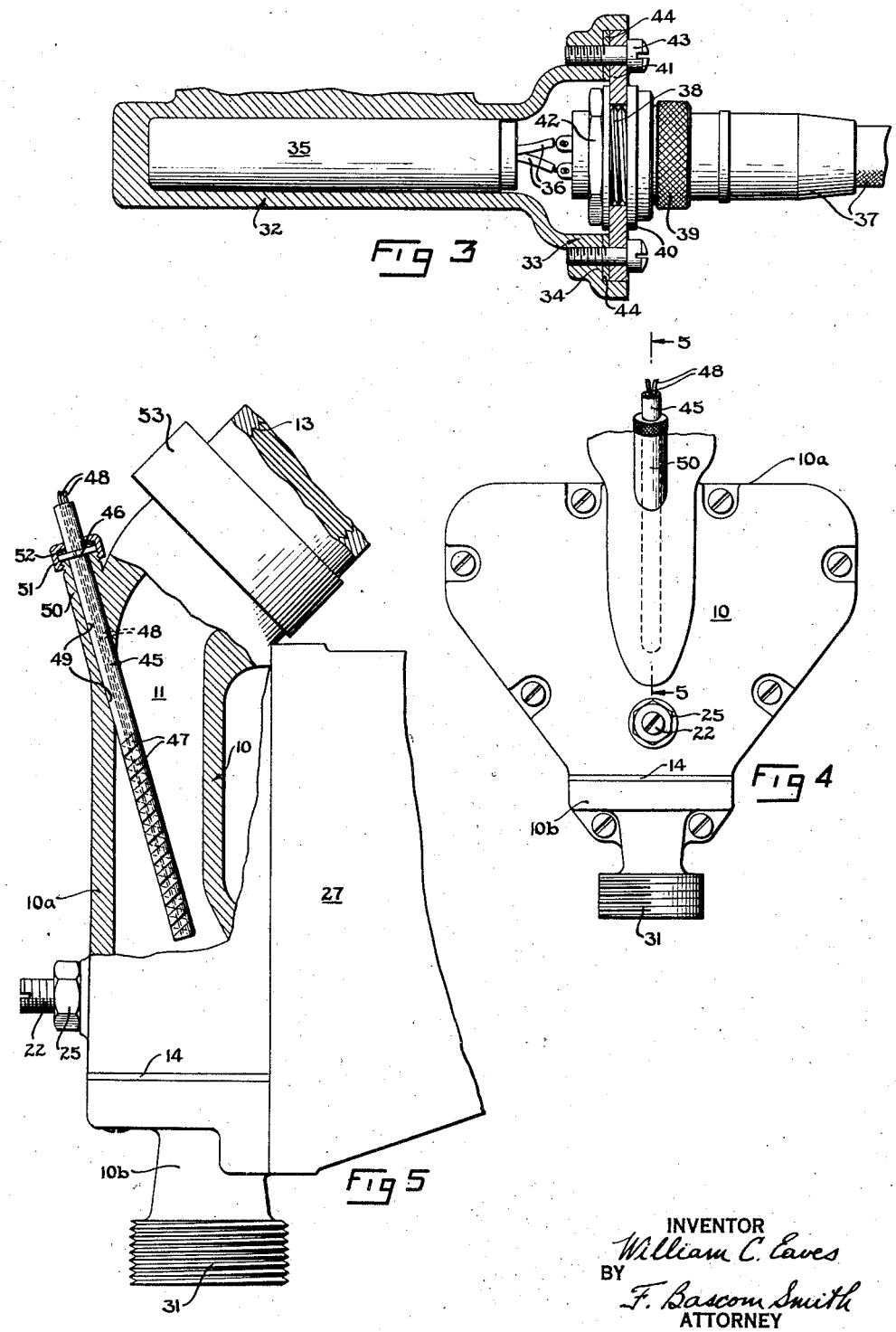

Patented Jan. 20, 1948

2,434,842

UNITED STATES PATENT OFFICE 2,434,842

PNEUMATIC SOUND PRODUCING DEVICE

William C. Eaves, Elyria, Ohio, assignor to Eaves Sound Projectors, Inc., New York, N. Y., a corporation of Delaware Application January 1, 1942, Serial No. 425,369

5 Claims. (Cl. 179—108)

This invention relates to sound heads of the air flow type wherein vibratory means modulate a stream of air to impart sound producing characteristics thereto.

Sound reproducing devices of the type utilizing a modulated air stream as the sound generating medium have heretofore been proposed for use in amplifying systems but have proven unsatisfactory when required to operate under low temperature conditions. The throttling effect of the modulating valve in devices of this type causes a precipitation and condensation of the moisture from the air stream and the accumulation on the valve and the parts adjacent thereto of this moisture. At freezing temperatures the moisture forms into ice, creating an obstruction which distorts the air stream and causes the sound reproduction to diminish in volume and to become inferior in quality and fidelity. It has been proposed to remedy this defect by connecting the air compressor close to the air head so that the heated air discharged from the compressor enters the sound head in its heated condition. However, this arrangement is not only impractical in outdoor units but causes the air, during the flow thereof through the sound head, to be subjected to a continuous drop in temperature with the maximum drop occurring at the modulating valve. As a result, the temperature of the air stream frequently drops below the dew point at or close to the valve and causes a substantial precipitation of moisture in the vicinity of the valve. The condensation thus produced tends to accumulate on those valve parts which do not directly come in contact with the high velocity air stream, affecting the operation of the valve and the quality of the sound reproduction. Moreover, the greater quantities of moisture precipitated at the valve due to the decreasing temperature tend to accelerate corrosion and to substantially increase the leakage of moisture from said valve to the actuating means.

Accordingly, one of the objects of the present invention is to provide a novel sound head having means for preventing the formation of ice on and in the vicinity of the valve parts, said means being adapted to increase the temperature of the air as the latter flows through the sound head in the direction of said valve parts so as to minimize the precipitation and condensation of moisture at the valve.

Another object is to provide a novel unit for heating the valve and the walls of the fluid passage of a sound head whereby the efficiency and quality of the sound reproduction of the latter is unaffected by ambient, freezing temperatures, said unit being mounted so as to provide a minimum or no effect on the flow of the air through said passage.

A further object is to provide novel heating means in the path of the air stream in a sound head, whereby the air stream is directly heated and radiant heat is supplied to the valve parts.

A still further object is to provide a sound head having a novel heating apparatus mounted thereon so as to be readily disassembled for inspection or replacement, said apparatus being compact, durable and efficient in operation.

Another object is to provide novel means for controlling the flow of fluid from a pressure source to the modulating valve of the sound head.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention, reference for this latter purpose being had primarily to the appended claims.

In the drawings, wherein like reference characters refer to like parts throughout the several views, Fig. 1 is a front view in elevation of a sound head embodying one form of heating unit in accordance with the present invention;

Fig. 2 is a view partly in section and partly in elevation, with parts broken away, of the above sound head, the section being taken substantially along line 2—2 of Fig. 1;

Fig. 3 is a sectional view of the heating unit, the section being taken substantially along line 3—3 of Fig. 1;

Fig. 4 is a view similar to Fig. 1, showing another embodiment of the present invention; and, Fig. 5 is a view partly in section and partly in elevation of the sound head of Fig. 4, the section being taken substantially along line 5—5 of Fig. 4.

An air head embodying one form of the invention is shown, by way of example, in Figs. 1 to 3, and comprises a metallic housing 10 having a fluid passage 11 (Fig. 2) extending therethrough, said housing being preferably formed in two sections 10a and 10b which are joined by screws 12. A suitable source of compressed air (not shown) is preferably provided to admit air at a constant pressure into passage 11, and may be connected to internally threaded inlet portion 13 of said passage, said inlet portion being contained in section 10a.

To modulate the air stream produced by the admission of air under pressure into passage 11, suitable vibratory means, preferably valve means of the grid type, are provided in the path of the air stream in said passage. As shown, said valve means comprise a stationary grid 14 (Fig. 2) rigidly clamped between sections 10a and 10b and a movable grid 15, the latter being adapted to impart the desired modulations to the air stream when vibrated relative to the stationary grid. Grid 15 preferably extends through a recess 16 in the wall of passage 11, and is pivotally mounted on the exterior of said passage by mounting means which, as shown, comprise an arm 17 formed integrally with grid 15 and a thin, flat member 18, the latter being preferably formed of spring steel to serve as a torsion spring support for said arm. Member 18 is secured intermediate its ends to said arm, being supported at its ends by housing 10, and may have one or more pivot pins 19 cooperating therewith to control the pivotal movement thereof. To minimize the escape of air and the flow of moisture from passage 11 through recess 16, the latter has a groove 16' in the wall thereof filled with a member 16a of relatively soft, non-resonant material, such as sponge rubber, which engages grid 15 and closes said recess.

It is desirable, in order to render grid 15 sensitive to slight actuating forces, to balance the latter in open position in the air stream and, accordingly, suitable balancing means are provided for opposing the counter-clockwise pivotal movement (as viewed in Fig. 2) which the air stream tends to induce in said grid. In the illustrated embodiment, the balancing means comprise a pressure responsive member, such as a metallic diaphragm 20, mounted in the wall of passage 11 to be actuated by the pressure in said passage, and connected by a link 21 of non-resonant material, such as soft rubber, to the upper end of arm 17. The pressures in passage 11 tend to displace said diaphragm to the right and are transmitted by link 21 and arm 17 to grid 15 and impart a clockwise balancing torque to the latter. To augment the balancing torque applied by diaphragm 20, a hollow rod 22 may be threadedly mounted in an opening 23 in the wall of passage 11, said opening being located opposite said diaphragm so that said rod extends through said wall in the direction of the diaphragm. A spring-pressed pin 24 of non-resonant material, for example, rawhide or hard rubber, is carried by said rod and projects therefrom to engage diaphragm 20 as the latter moves to the left, thereby supplementing the balancing force applied by said diaphragm. The magnitude of this additional balancing force provided by pin 24 may be varied by adjusting the axial position of rod 22. To prevent inadvertent movement of said rod, a lock nut 25 is preferably threaded on the end thereof exterior of housing 10.

A suitable actuating mechanism 26 for imparting controlled vibrations within the range of audible frequencies to grid 15 is provided, and is preferably mounted in a casing 27 carried by housing 10. In the form shown, mechanism 26 is of the electromagnetic type adapted to convert electrical undulations into vibrations of an armature 28, the latter, as shown, being operatively connected by a link 29 to an arm 30 formed with or otherwise rigidly secured to arm 17. Accordingly, vibrations of armature 28 are transmitted by link 29 and arm 30 to grid 15 and are imposed by said grid on the air stream to modulate the latter and produce sounds in accordance with the frequency of vibration of said armature. A suitable sound propagating device, such as a horn (not shown), may be mounted at the outlet end of passage 11, for example, on an externally threaded portion 31 of section 10b.

To maintain the surfaces of grids 14 and 15 and the walls of passage 11 free of ice regardless of the temperature of the surrounding atmosphere and to minimize the condensation of moisture within passage 11, particularly at valve 14, 15, novel heating means are provided and are mounted in a novel manner so as to maintain a maximum air stream temperature in the vicinity of the valve. As illustrated, the heating means comprise a substantially cylindrical casing 32 (Figs. 1 and 2) rigidly secured to housing 10, preferably by being integrally formed with section 10a so as to constitute a part of said housing. Casing 32, as viewed in Fig. 2, extends transversely to the left and below section 10a at the lower end of the latter and the longitudinal axis thereof is substantially parallel to the faces of grid 14 (Fig. 1), said casing being disposed adjacent one edge of said grid so as to project beyond the sides and ends of the latter. One end of said casing is preferably closed and the open end is provided with a head portion 33 of enlarged diameter, said head portion having an outwardly extending flange 34 (Fig. 3) formed therewith.

An electrical heating coil or cartridge 35 is removably mounted in casing 32 and has leads 36 thereof connected by an insulated cable 37 to a source of power (not shown). Cable 37 is provided with an externally threaded sleeve 38 secured thereto by nut 39, said sleeve having a flange 40 formed therewith. An annular disc or plate 41 is mounted on said cable by being clamped between a nut 42 and flange 40 and is, in turn, secured to flange 34 by suitable means, such as screws 43. A gasket 44 may be interposed between flange 34 and plate 41 to form a substantially fluid-tight seal at the open end of the casing.

In operation, the admission of air under pressure into passage 11 creates an air stream in said passage and the velocity of said stream pivots grid 15 to open position, in which position said grid is balanced by the action of diaphragm 20 and mechanism 22, 24. Grid 15, actuated by electromagnetic means 26, modulates the air stream to produce sounds in accordance with the vibrations of armature 28, said vibrations being transmitted from said armature to said grid by link 29 and arm 30. Heating means 35 are energized during operation and the heat generated thereby is conducted by section 10a to grid 14 and is also radiated from casing 32 to the edge of said grid and section 10b, increasing the temperature of valve 14, 15, of the parts adjacent thereto and of the air flowing through said valve. As a result, valve 14, 15 and the parts in the vicinity thereof are maintained at a temperature in excess of freezing, preventing ice formation. Moreover, the maximum heating of the air stream occurs at the valve so that the temperature of the stream tends to increase and the capacity thereof for precipitating moisture tends to decrease as the stream approaches the valve.

Another embodiment of the invention is illustrated in Figs. 4 and 5, and the parts thereof which correspond to parts of the above-described embodiment are designated by similar numerals. The heating means of this second embodiment are mounted in the path of the air stream so as to progressively heat the latter as it approaches the modulating valve. As shown, the heating means comprise a hollow member or core 45 of suitable heat resistant insulating material, preferably a ceramic such as porcelain, having an annular flange 46 (Fig. 5) formed at the upper end thereof. A thin ribbon 47, for example, of Nichrome or similar conducting material is wound in a spiral on the lower end of said core to serve as a heating coil, the ends of said ribbon being connected to a source of power (not shown) by leads 48 which extend through the bore of said core.

To operatively mount member 45 so that coil 47 is in the path of the air stream, a recess 49, provided in the front wall of section 10a, communicates with passage 11, and member 45 extends through said recess into said passage. The axis of said recess is inclined at an acute angle to the direction of flow of the air stream so that coil 47 has the axis thereof inclined at a like angle in the direction of air flow and intercepts the air stream for a substantial length thereof. A sleeve or collar 50 surrounds the upper end of said recess, being preferably formed integrally with section 10a, and flange 46 of member 45 engages the upper end of said sleeve to determine the axial position of said member. The outer end of sleeve 50 is externally threaded to receive an internally flanged nut 51 which is adapted to rigidly secure member 45 relative to housing 10. A gasket 52 may be interposed between flange 46 and nut 51 to seal recess 49 and prevent the escape of air from passage 11 during operation. When member 45 is removed from recess 49, it is preferable to thread a cap on the end of sleeve 50 to prevent air escape or admission through said recess from or into passage 11.

In operation, the heat given off by coil 47 is transmitted to the air stream and the temperature of the latter tends to increase as it approaches the modulating valve. Accordingly, the valve parts are maintained at a temperature in excess of freezing by the heat conducted and radiated from said coil, and the air stream is progressively heated in its travel toward the valve.

It is highly desirable to provide suitable valve means for controlling the flow of fluid from the pressure source, such as an air compressor, to passage 11 of the housing 10. Heretofore, hand operated, mechanical valves have been employed for this purpose, such valves being usually mounted in the air line adjacent the compressor and frequently at a relatively great distance from the modulating valve. Such a system produced a "foreign effect" on the grid, resulting in wailing and siren-like noises each time the fluid pressure was turned on or off. To overcome these defects, there is preferably provided a solenoid valve of any suitable and well-known type, which is diagrammatically shown at 53, Fig. 5. The switch (not shown) for energizing the solenoid coil is preferably located closely adjacent the microphone for transmitting sound vibrations or electrical impulses to the voice coil of the electro-mechanical actuating means 26. Since the solenoid valve is operatively secured to the sound head at the inlet end of passage 11, there is no time lag between the opening or closing of the solenoid valve and the operation of the modulating valve, whereby wailing noises are eliminated.

There is thus provided a novel sound head of the fluid flow type having means for preventing ice formation and for eliminating moisture condensation on the modulating means and the parts adjacent thereto. Heating means are mounted in a novel manner to maintain the valve parts at a temperature in excess of freezing without deleteriously affecting the flow of air or other fluid medium through the fluid passage of the sound head. The heating means may be economically fabricated, readily installed and easily replaced in the event of failure. Because of the novel mounting for the heating means, it is possible, under favorable operating conditions, i. e., in warm temperatures and with dry air, or when the heating unit is being repaired with no replacements available, to utilize the air head without said unit.

Although only two embodiments of the present invention have been illustrated and described, it is to be expressly understood that the same is not limited thereto. For example, it will now be apparent to those skilled in the art that a heating coil concentric with passage 11 might be mounted on or in the walls of said passage. Various other changes may be made in the design and arrangement of parts without departing from the spirit and scope of the invention. For a definition of the invention, reference will be had primarily to the appended claims.

What is claimed is:

1. In a sound reproducing device of the fluid flow type comprising a housing, a fluid passage in said housing and valve means adapted to modulate the flow of a fluid stream through said passage, heating means carried by said housing, said heating means comprising an exposed heating coil disposed in said passage to extend angularly in the direction of said valve means on the high pressure side thereof.

2. In a pneumatic sound producing device wherein the sound is carried by a moving stream of gas, means to modulate the gas stream comprising a grid obstruction of variable orifice, a casing enclosing said grid obstruction, and means on said casing for heating the latter adjacent said grid obstruction to maintain the temperature at the grid obstruction above the dew point of the gas stream at the conditions of humidity and pressure there pertaining.

3. In a pneumatic sound producing device wherein the sound is carried by a moving stream of gas, means to modulate the gas stream comprising a grid obstruction of variable orifice, a casing enclosing the working parts including the grid obstruction, a socket in the casing in proximity to the grid obstruction, and a cylindrical heater element adapted to be telescoped within the cylindrical socket.

4. In a pneumatic sound producing device wherein the sound is carried by a moving stream of gas, means to modulate the gas stream comprising a grid obstruction of variable orifice, a casing enclosing the working parts including a tube adapted to carry a gas stream to the grid obstruction, and a heating element mounted in the tube and projecting within the gas stream.

5. A sound producer including an air flow modulator, a casing including said modulator, a socket thereon, an electrical heater element adapted to fit within the socket, a cover for the socket, and means to connect an electric cable to the heater element through the cover.

WILLIAM C. EAVES.

REFERENCES CITED

The following references are of record in the file of this patent:

UNITED STATES PATENTS

| Number | Name | Date |
|---|---|---|
| 1,123,418 | Steiner | Jan. 5, 1915 |
| 1,143,092 | Unckles | June 15, 1919 |
| 1,323,999 | Baker | Dec. 2, 1919 |
| 1,717,012 | Dixon | June 11, 1929 |
| 1,829,991 | Hetzel | Nov. 3, 1931 |
| 1,898,302 | Hetzel | Feb. 21, 1933 |
| 2,020,492 | Zahm | Nov. 12, 1935 |
| 2,079,693 | Lovell | May 11, 1937 |
| 2,141,208 | Eaves | Dec. 27, 1938 |
| 2,271,307 | Ray | Jan. 27, 1942 |
| 2,371,960 | Eaves | Mar. 20, 1945 |
| 2,384,371 | Dilks | Sept. 4, 1945 |

FOREIGN PATENTS

| Number | Country | Date |
|---|---|---|
| 176,442 | Switzerland | June 17, 1935 |